United States Patent [19]

Ray

[11] Patent Number: 5,635,229
[45] Date of Patent: Jun. 3, 1997

[54] BEVERAGE CONTAINER INCLUDING AN AFFIXED SCENT DISBURSEMENT MEANS FOR ENHANCING PERCEIVED FLAVOR OF THE BEVERAGE

[76] Inventor: Kenneth W. Ray, 2471 27th Ave., Sacramento, Calif. 95822

[21] Appl. No.: 406,744

[22] Filed: Mar. 20, 1995

[51] Int. Cl.⁶ .................................................. B65D 85/72
[52] U.S. Cl. ........................ 426/112; 426/115; 426/131; 206/205
[58] Field of Search ........................ 426/392, 397, 426/398, 415, 394, 115, 131, 112, 124; 215/386, 392, 6; 206/205

[56] References Cited

U.S. PATENT DOCUMENTS

| | | | |
|---|---|---|---|
| 1,998,683 | 4/1935 | Montgomery | 206/205 |
| 2,007,632 | 7/1935 | Blank et al. | 206/205 |
| 2,314,146 | 3/1943 | Katz | 206/205 |
| 2,357,258 | 8/1944 | Harris | 426/316 |
| 3,043,464 | 7/1962 | Cerasari | 215/11.1 |
| 3,603,454 | 9/1971 | Raaf | 206/205 |
| 3,717,476 | 2/1973 | Harvey | 426/131 |
| 3,730,737 | 5/1973 | Harvey | 426/115 |
| 3,740,239 | 6/1973 | Chancellor | 426/131 |
| 4,349,104 | 9/1982 | Hayes | 206/205 |
| 4,475,663 | 10/1984 | Kittscher et al. | 206/205 |
| 4,659,390 | 4/1987 | Zeller et al. | 426/112 |
| 4,858,758 | 8/1989 | Mitchell et al. | 215/386 |
| 4,990,345 | 2/1991 | Webb | 426/398 |

FOREIGN PATENT DOCUMENTS

| | | | |
|---|---|---|---|
| 1460 | 4/1979 | European Pat. Off. | 426/131 |
| 2-273142 | 11/1990 | Japan | 426/124 |
| 1206047 | 9/1970 | United Kingdom | 426/415 |

OTHER PUBLICATIONS

"Sustrelle" Lab. Manual Jun. 2, 1975.

*Primary Examiner*—Steven Weinstein

[57] ABSTRACT

An aromatic member affixed to the exterior of a single serving container of water which serves to enhance the perceived taste of the water by appearing to simulate the flavor of the scent. One embodiment of the aromatic member includes a scented ring attachable to the neck of the bottle. Another embodiment of the aromatic member includes a cap having a flip-open lid wherein the interior surface of the lid contains material infused with the scent. The method of use includes affixing the aromatic member disbursing a scent to the container in close proximity to a dispensing opening of the container and drinking from the container with one's nose in close proximity to the aromatic member while at the same time periodically breathing through the nose during drinking.

5 Claims, 7 Drawing Sheets

BEVERAGE CONTAINER INCLUDING AN AFFIXED SCENT DISBURSEMENT MEANS FOR ENHANCING PERCEIVED FLAVOR OF THE BEVERAGE

BACKGROUND OF THE INVENTION

1. Field of the Invention

This invention relates to an aromatic beverage container involving a scented member affixed to a single serving container of drinkable liquid such as water which serves to enhance the perceived taste of the liquid.

2. Description of the Prior Art

It has become increasingly popular in recent years to be more health conscious and to drink beverages which are more natural and low in calories and additives. Bottled water has also become very popular primarily due to the fact there are typically no preservatives or artificial additives, and there are no calories. One variation of bottled water includes the addition of a mild fruit flavor which enhances the taste, giving the person the perception they are drinking more than just water. One disadvantage of this flavored water is that the flavorings often contain chemicals and or calories which some people find objectionable.

It would therefore be an improvement to provide a bottled water that appears to have various flavors without the disadvantage of calories or the addition of any type of additives to the water itself.

SUMMARY OF THE INVENTION

The present invention includes an aromatic member which is attached or attachable to a container of drinkable liquid such as water, normally a single serving container of water. The method of use includes affixing the aromatic member disbursing a scent to the container in close proximity to a dispensing opening of the container and drinking from the container with one's nose in close proximity to the aromatic member while at the same time periodically breathing through the nose during drinking.

The purpose of the aromatic member or aromatic container is to give the water a simulated, enhanced or perceived flavor. It is known that the olfactory nerves found in the nasal cavity play an important role in the sense of taste. When the sense of smell is adversely effected, taste is significantly reduced, such as when one has a cold. Alteratively, when an over powering odor is present it tends to mask the taste and the person can actually perceive to be tasting the odor instead of the actual flavor of that which he is ingesting. Therefore, the scented member gives the user the perception that he is tasting the flavor of the scent, such as cherry, even though he is drinking only plain water. The person therefore gets the enjoyment of drinking a flavored water without the disadvantage of calories or artificial additives. The aromatic member can also be used to enhance the flavor of other beverages, such as cola where a cherry scented aromatic member would allow the user to perceive he is drinking a cherry flavored cola. Or if some beverages are only slightly flavored, the same scent may be used to increase the perception of the quality of that particular flavor without additional additives or calories to the beverage.

One possible structural embodiment of the invention includes an absorbent ring which has been saturated with a specific scent, preferably fruit odors such as cherry or apple for example. The scents preferably include aromatic oils or scented crystals, and although they are not designed to be ingested, they are non-toxic. The ring is sized for placement over the top end of the bottle and will rest on the bottle neck. Since it is preferable that the ring be kept moist to prevent drying out of the scent during storage prior to use, the ring can be covered with a removable protective air tight covering. The ring may be affixed to the bottle neck prior to sale with the covering, such as cellophane, extending over the ring and a portion of the bottle neck. The cellophane would be removed just before or after the bottle is opened. The ring can also be provided in a separate protective package affixed to the side of the bottle. When the bottle is purchased, the package can be opened and the ring removed and placed over the neck of the bottle by the user.

Another possible structural embodiment of the invention includes a plastic or metal ring which houses an absorbent material inside which has been saturated with the scent. This ring is affixed to the bottle and the scent can be released by removing a pull tab strip located on the exterior edge of the ring which exposes the absorbent material. These last two embodiments give the user the option of whether or not to remove the package and expose the scent.

Yet another possible embodiment of the invention includes a modified cap having a flip open living hinged lid with the scent incorporated into the lid itself. The cap may contain a large aperture for drinking directly from the cap, or preferably the aperture is sized for passage of a straw, which can be provided attached to the side of the bottle or contained inside.

Other embodiments of the invention include the aromatic member applied either removably or inherent to the surface of a removable lid for a cup and also to the surface of a canned beverage.

An improved understanding of the invention will be gained with continued reading and with an examination of the included drawings.

BEST MODES FOR CARRYING OUT THE INVENTION

Figure 1:
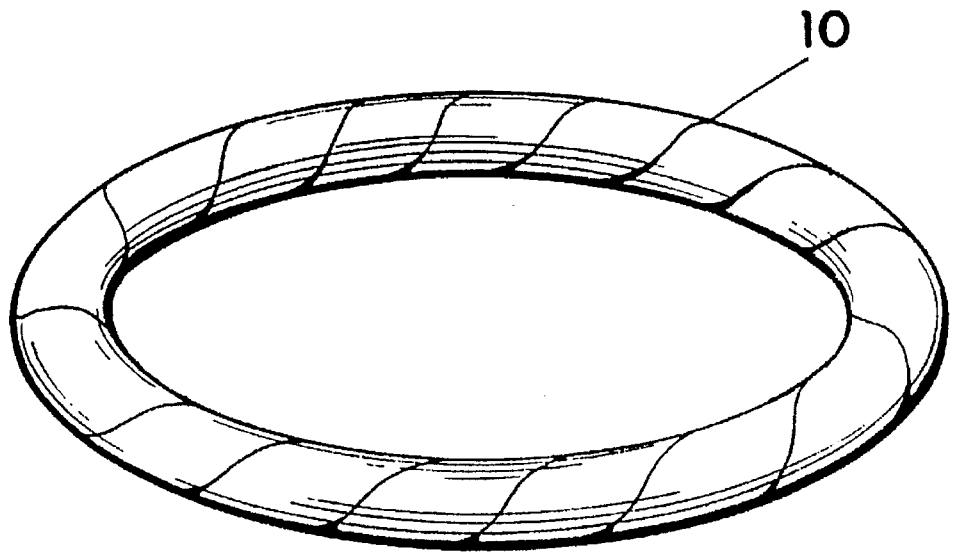
FIG. 1 is a top perspective view of one embodiment of the invention showing an absorbent aromatic ring.
Figure 2:
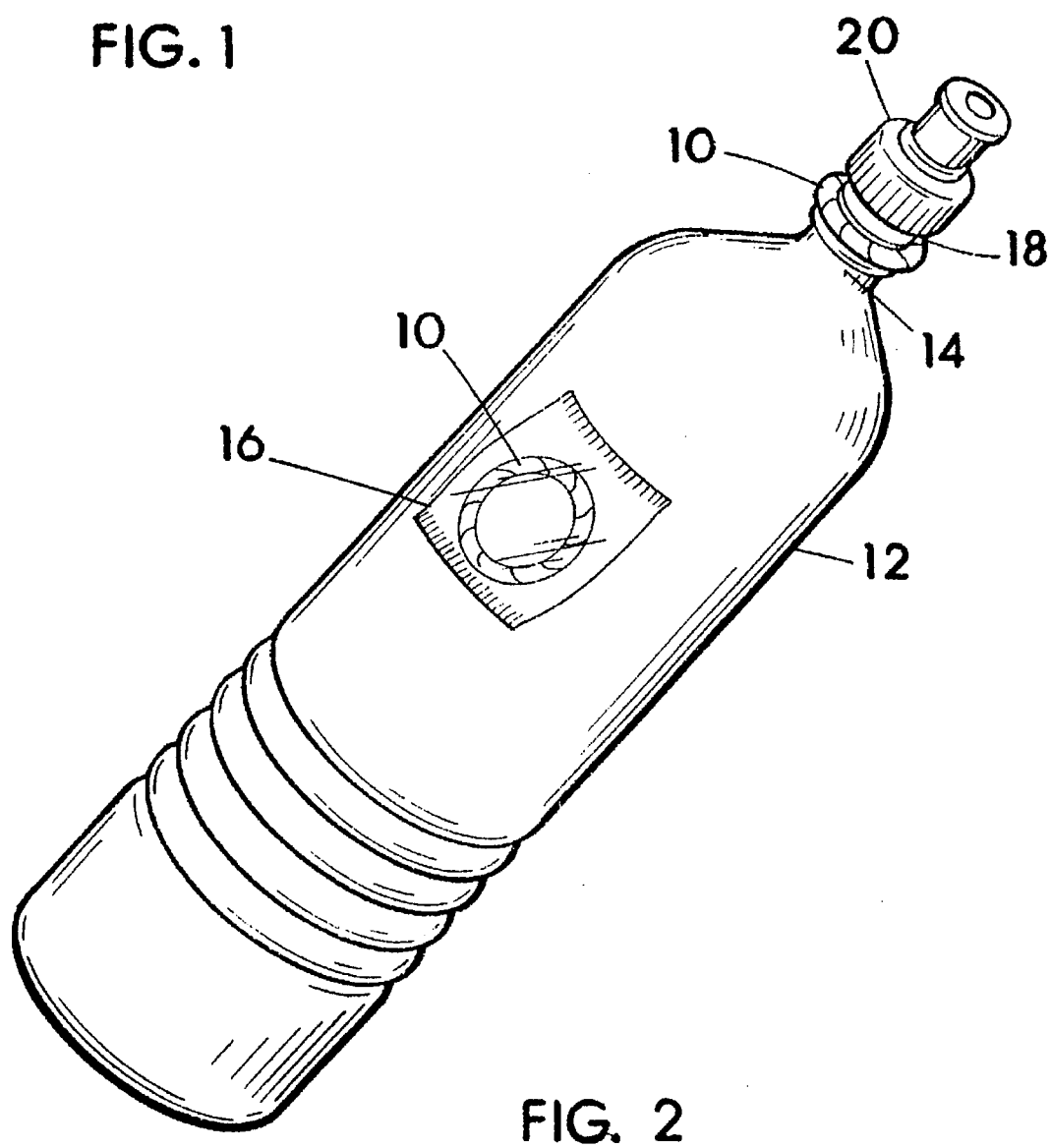
FIG. 2 illustrates the embodiment of FIG. 1 attached to the neck of a water bottle.

Referring now to the drawings where several embodiments of the aromatic member for simulating flavors are illustrated. The first embodiment of the aromatic member, hereinafter referred to as embodiment 10, includes a small ring structured of an absorbent, flexible, somewhat elastic material such as cotton cording which has been saturated with a particular scent 50. Although scent 50 preferably includes fruit odors, other scents 50 such as chocolate and peppermint are also suitable. Embodiment 10 can be provided with water bottle 12 or purchased as a separate article. If provided with water bottle 12, embodiment 10 can be permanently affixed, such as with non-toxic adhesives, to the neck 14 of bottle 12, or it can be provided in a separate air tight package 16 which is removably affixed, such as with adhesives, to the exterior of bottle 12. Package 16 can be removed from bottle 12 and the aromatic member removed and placed over the open top end 18 of bottle 12, and positioned over neck 14. Cap 20 of bottle 12 helps to maintain embodiment 10 in position over neck 14 of bottle 12.

It is preferred that the aromatic members be placed adjacent the dispensing end of bottle 12 so it will be close enough for the user's nose to smell the member when drinking from bottle 12 and breathing at the same time. It should be noted breathing during drinking does not need to be continuous, but can be periodic.

Figure 3:
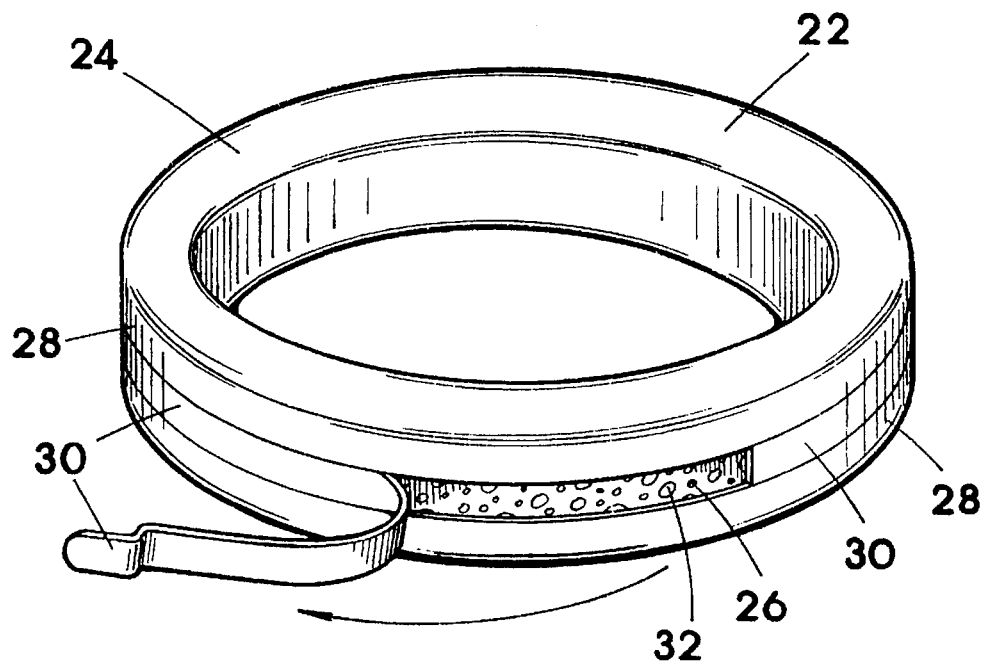
FIG. 3 is a top perspective view of another embodiment of the aromatic ring showing a pull tab strip in the process of being removed to expose the absorbent scented material.
Figure 4:
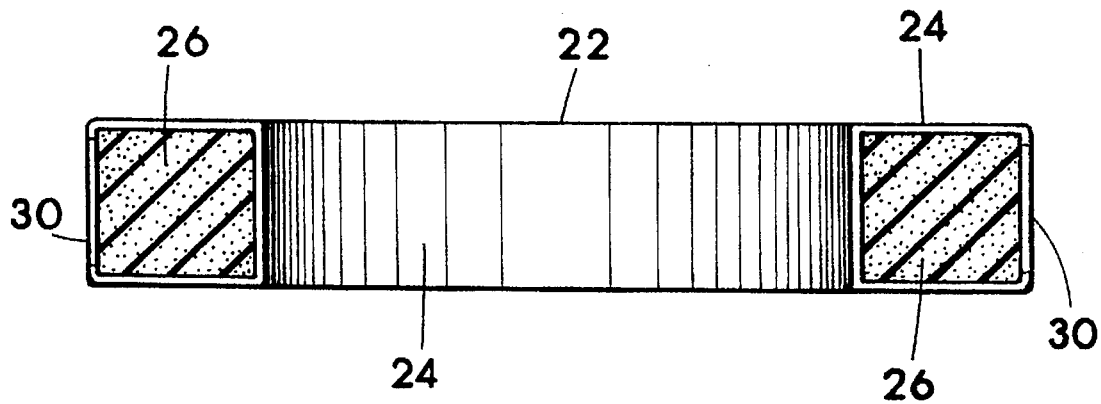
FIG. 4 is an enlarged cross sectional side view of the embodiment of FIG. 3.
Figure 5:
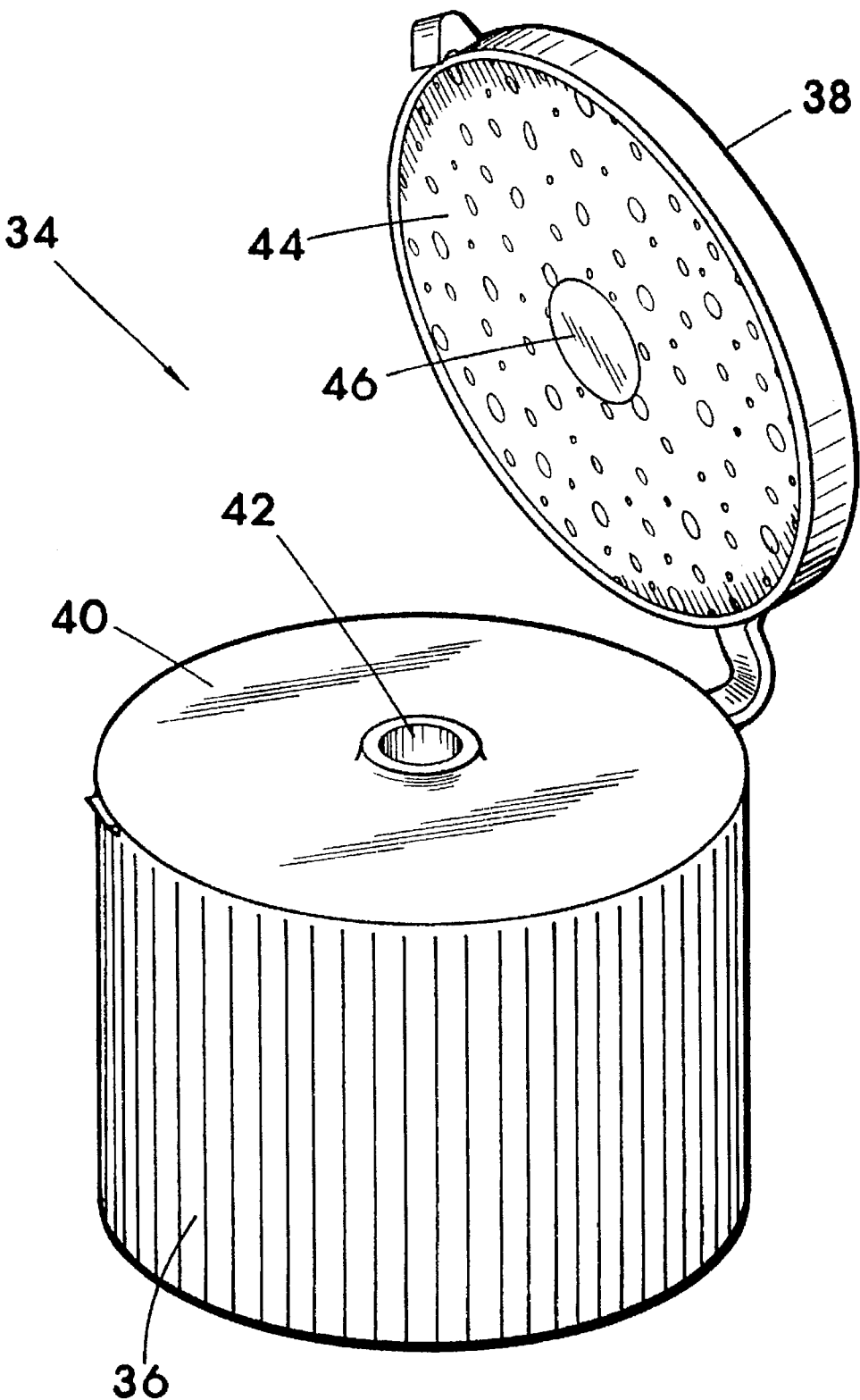
FIG. 5 is a top perspective view of another embodiment of the invention depicting a bottle closure (cap) with a flip-open lid having the scented material affixed to the interior surface of the lid.
Figure 6:
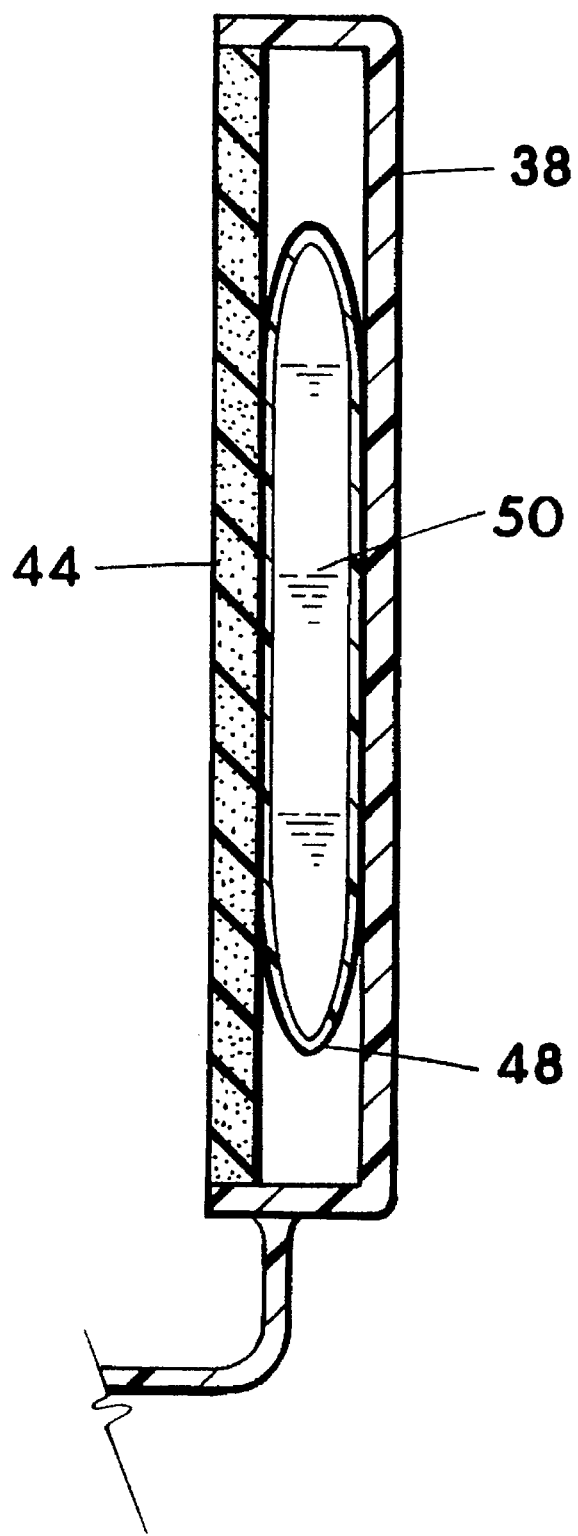
FIG. 6 is a cross sectional side view of the lid of FIG. 5 showing an alterative embodiment wherein a burstable pouch containing liquid scent is located beneath an absorbent layer of material.
Figure 7:
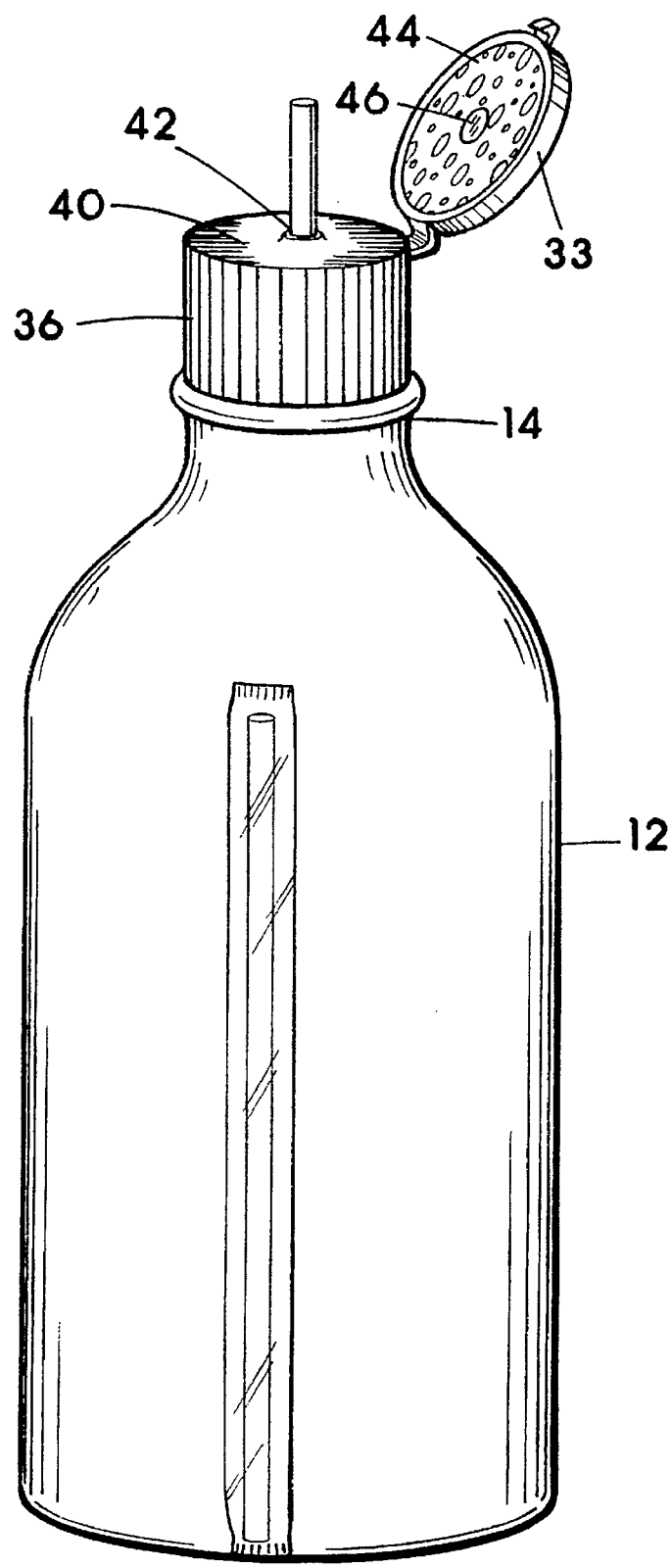
FIG. 7 illustrates the cap of FIG. 5 affixed to a bottle with a drinking straw in use.
Figure 8:
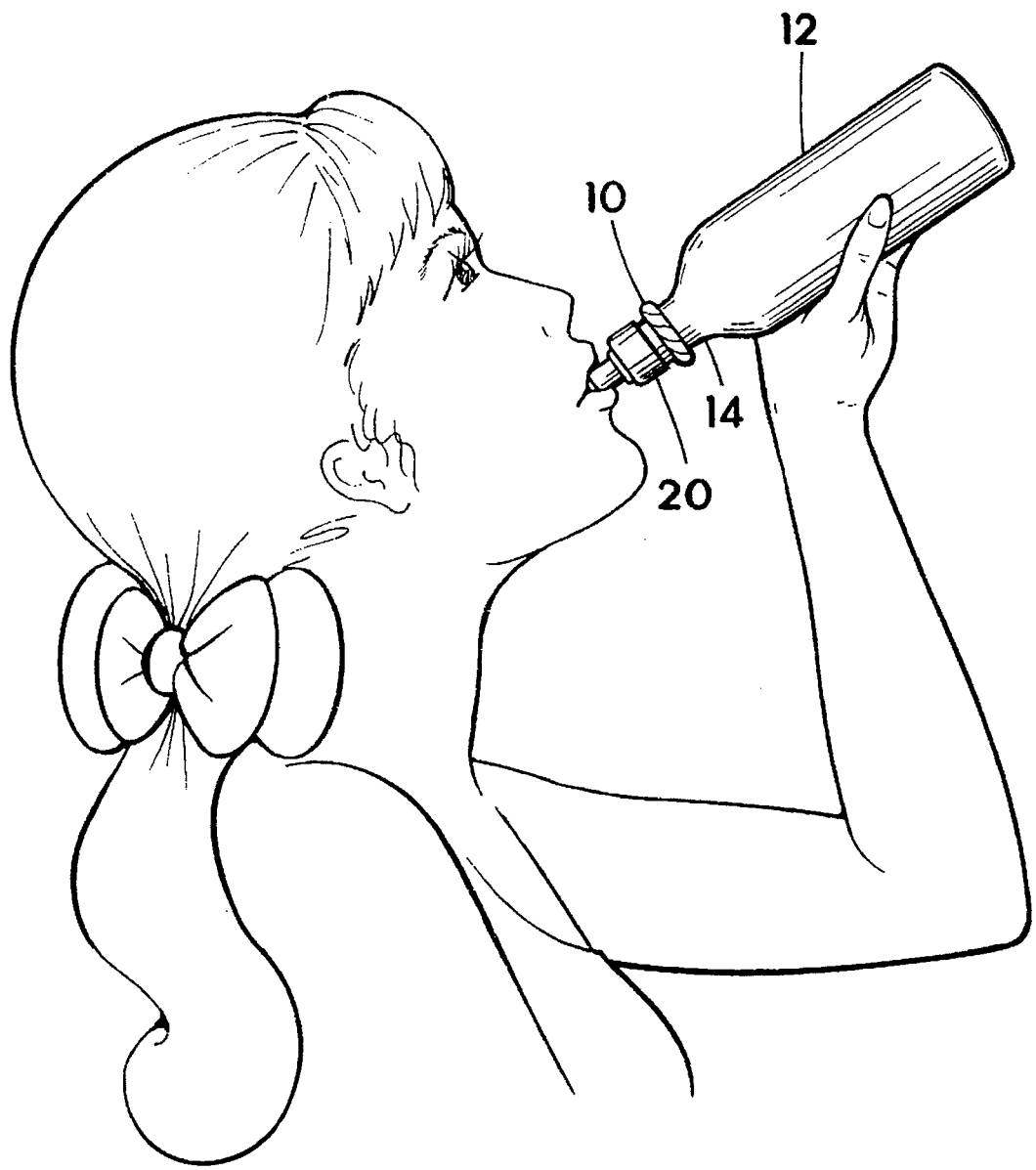
FIG. 8 illustrates a person drinking from a water bottle to which the aromatic ring of FIG. 1 has been attached. The aromatic ring is shown in close proximity to the person's nose.

Another embodiment of the aromatic member, referred to as embodiment 22 and shown in FIG. 3, also includes a ring attachable to neck 14 of bottle 12, however embodiment 22 is structured of an annular ring having a semi-rigid outer protective housing 24 and interior layer of aromatic material 26. Housing 24 may be structured of plastic, metal or a reinforced waterproof paper. Housing 24 is formed into a four sided annular ring with the outer curved wall 28 incorporated with a pull off strip 30. The pull off strip 30 is integral with the annular wall 28, being connected to wall 28 by a thin seam or grooved edge which makes removal of strip 30 easier. The complete or partial removal of strip 30 leaves an opening 32 in the outer wall 28 which exposes aromatic material 26 to disperse scent. Aromatic material 26 can be composed of any suitably absorbent non-toxic material which is compatible with the particular scent 50 instilled therein. Embodiment 22 is preferably affixed with adhesives or friction or snap fit to the neck 14 of bottle 12 prior to distribution and sale, or alternatively may be made as a bottom portion of a bottle closure which includes a dispensing opening allowing the closure to be opened and the bottle contents dispensed with the closure remaining on the neck of the bottle.

Another embodiment of the aromatic member includes embodiment 34, which encompasses a removable cap having an interior threaded base 36, for engagement with the threads on bottle 12, and a flip-open lid 38. Base 36 also includes a textured outer surface for better gripping, and a flat top surface 40 with a central dispensing opening 42 for removal of the bottle 12 contents. Lid 38 is affixed to base 36 with a living hinge and generally includes a flat top surface with a short downward depending annular wall. The interior of lid 38 is covered with a layer of absorbent material 44 onto which scent 50 is instilled. To prevent leaching of scent 50 from absorbent material 44 into the contents of bottle 12, a thin removable plastic film can cover absorbent material 44 prior to use. Preferably, just a small central area on absorbent material 44 adjacent opening 42 may be covered with an impervious plastic which provides a seal 46 to prevent seepage. Since absorbent material 44 is compressible, when lid 38 is snapped closed, dispensing opening 42 on base 36 is sealed. Absorbent material 44 is also kept moist and protected from contamination when lid 38 is in the closed position. Dispensing opening 42 may be large enough for the user to drink from or dispensing opening 42 may be sized for passage of a straw.

As an alternative variation of embodiment 34, a burstable pouch 48 containing a liquid or crystal scent 50 can be located beneath absorbent material 44. When bottle 12 is purchased, the person opens lid 38 and presses absorbent material 44 and the outer surface of lid 38 together between his fingers, compressing and bursting pouch 48 and releasing scent 50 into absorbent material 44 which releases scent 50 into the air. Protective seal 46 of embodiment 34 could therefore be eliminated and scent 50 would be well protected and remain fresh almost indefinitely.

Figure 10:
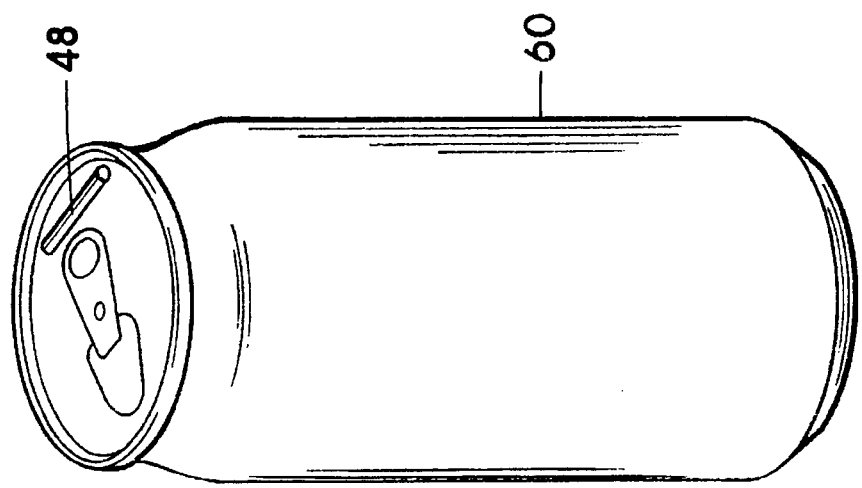
FIG. 10 illustrates yet another embodiment of the invention wherein the aromatic member is affixed to the exterior of a beverage can.
Figure 9:
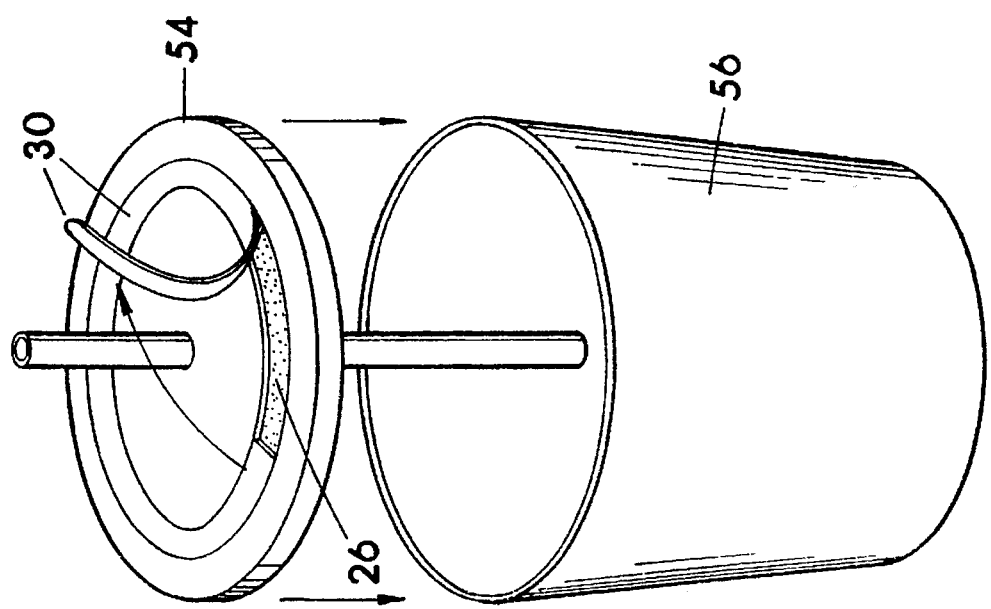
FIG. 9 illustrates another embodiment of the invention wherein the aromatic member is incorporated into a removable lid or cover for a drinking cup.

Alternative embodiments of the invention also include a removable lid or cover 54 for a drinking cup 56 which is removably or inherently affixed with aromatic material 26 infused with scent 50. FIG. 9 illustrates a partially removed pull strip 30 on a cover 54 showing the aromatic material 26 just beneath. Another embodiment also includes an aromatic member affixed to the top surface of an aluminum beverage container or can 60. The aromatic member shown in FIG. 10 depicts a pressure burstable pouch 48 although other members, such as absorbent material 44, could also be used.

Although not shown in the drawings, the aromatic member can also be in the form of a small patch of adhesively affixed material infused with scent which may be affixed to the upper top end of a bottle, can, or to caps 20 having pull open dispensing apertures. The patches can be absorbent material containing scent or a type of paper or fabric infused with scent having an exterior coating which can be scratched off to release the aroma.

Although I have very specifically described the preferred structures and best modes of the invention, it should be understood that the specific details are given for example to those skilled in the art. Changes in the specific structures described may clearly be made without departing from the scope of the invention, and therefore it should be understood the scope of the invention is not to be overly limited by the specification and drawings given for example, but is to be determined by the spirit and scope of the appended claims.

What I claim as my invention is:

1. A hand holdable and sealed container having a single serving of drinkable liquid within the container, said container including closed openable means for allowing opening of said container for drinking directly from said container, scent disbursement means affixed to said container for disbursing a pleasant scent in close proximity to said openable means for enhancing perceived flavor of said drinkable liquid during drinking of said drinkable liquid directly from said container;

scent containment means for sealing and preventing said scent disbursement means from disbursing scent therefrom until the perceived enhanced flavor is desired; whereby said container can be stored absent scent disbursement until such time as a person intends to drink from said container;

means for un-sealing said scent containment means to allow scent disbursement from said scent disbursement means.

2. A hand holdable and sealed container according to claim 1 wherein said container is a bottle, and said drinkable liquid is water.

3. A hand holdable and sealed container according to claim 2 wherein said pleasant scent is a fruit scent.

4. A hand holdable and sealed container according to claim 3 wherein said scent disbursement means is a supply of aromatic material; and said scent containment means is a housing containing the supply of aromatic material in a sealed manner to prevent scent from escaping the housing.

5. A hand holdable and sealed container according to claim 4 wherein said means for un-sealing said scent containment means is a pull tab strip.

* * * * *